July 12, 1932. W. H. COLES ET AL 1,867,250
IRRIGATION DEVICE
Filed Dec. 14, 1927 2 Sheets-Sheet 1

INVENTOR.
Walter H. Coles
Bert J. Nelson
BY Maréchal and Noe
ATTORNEYS.

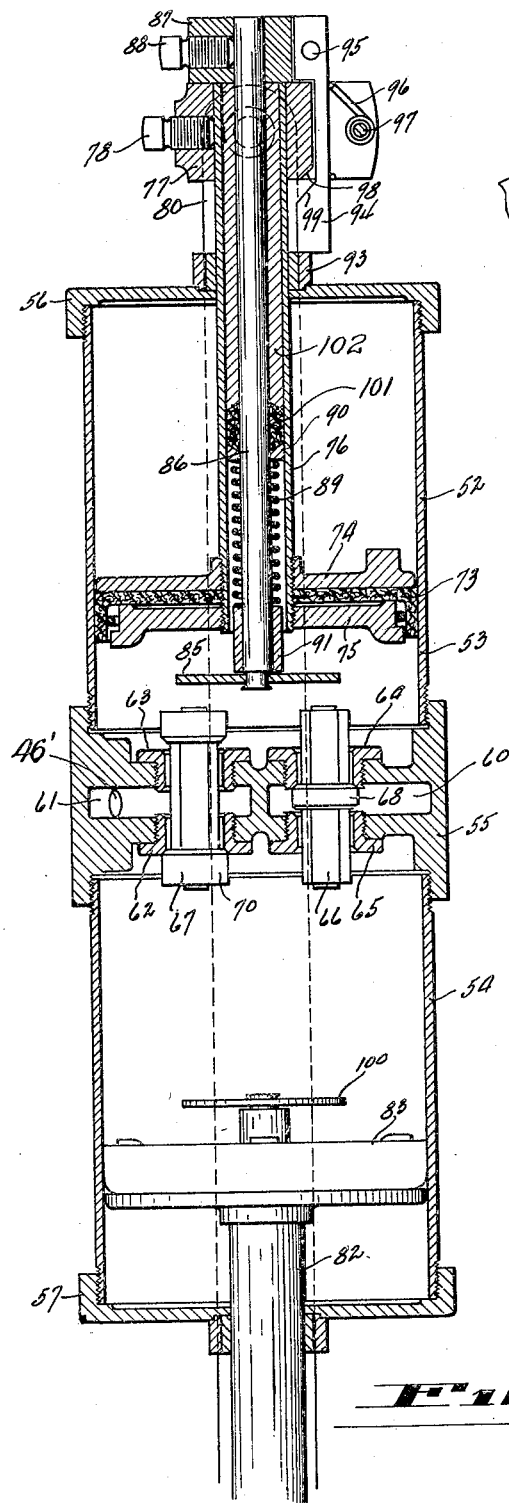

Patented July 12, 1932

1,867,250

UNITED STATES PATENT OFFICE

WALTER H. COLES AND BERT J. NELSON, OF TROY, OHIO, ASSIGNORS TO THE SKINNER IRRIGATION COMPANY, OF TROY, OHIO, A CORPORATION OF OHIO

IRRIGATION DEVICE

Application filed December 14, 1927. Serial No. 239,930.

This invention relates to water sprinklers and more particularly to automatic oscillators adapted to be used in the distribution of irrigation water or the like.

One object of the invention is the provision of an improved sprinkler or irrigation system comprising an elongated sprinkler member and motor-operated means for effecting oscillation thereof.

Another object of the invention is the provision of an automatic oscillator for such irrigation systems comprising a fluid motor, having a casing adapted to be held in fixed position and provided with an exhaust nozzle which is automatically moved during the operation of the fluid motor to distribute the discharge fluid of the motor.

A further object of the invention is the provision of a fluid motor for irrigation systems having means for causing full immediate operation of the valves to insure the reversal of the direction of motion of the piston at the proper time in the cycle of operation.

Other objects and advantages of the invention will be apparent from the accompanying description and from the drawings in which Fig. 1 is a perspective view of an automatic oscillator embodying the present invention;

Fig. 4 is a longitudinal section through the fluid motor on the line 4—4 of Fig. 2; and Fig. 5 is a fragmentary view of the ratchet segment and the backlash attachment.

Figure 2:
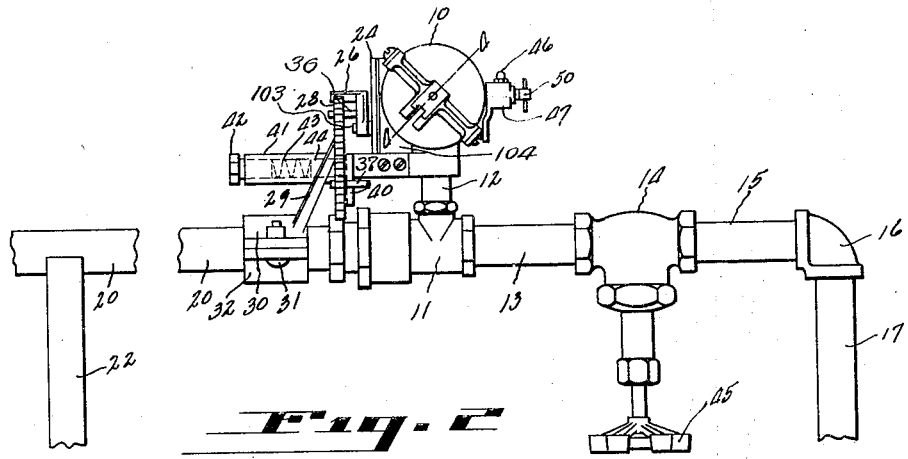
Fig. 2 is an elevation of an irrigation system embodying the automatic oscillator shown in Fig. 1.
Figure 1:
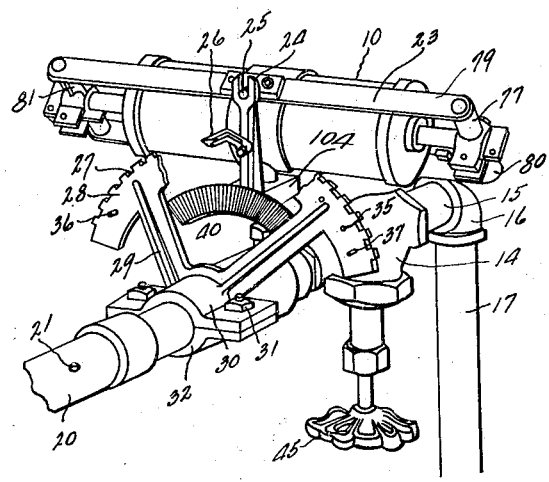
Figure 3:
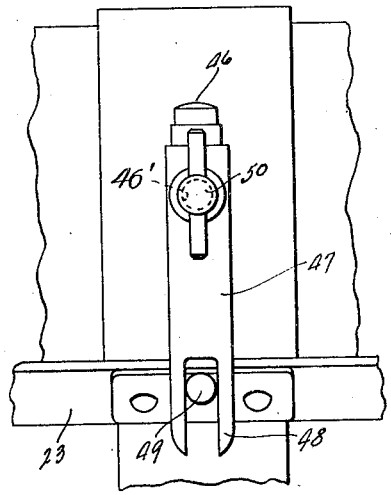
Fig. 3 is a rear elevation of a fragment of the oscillator motor showing the swinging exhaust nozzle.

Referring more particularly to the drawings by reference numerals, the automatic oscillator shown in Fig. 1 comprises a fluid motor designated generally 10 which is mounted rigidly upon a union 11 by means of a nipple connection 12. The union 11 is mounted on a short pipe 13 fastened to a globe valve 14 which is shown connected by a nipple 15 and elbow 16 to a riser pipe 17 through which irrigating water or the like may be supplied. The various pipes and connections mentioned form a part of the stationary end of an irrigation line, and the union 11 is connected to the end of a sprinkler or distributing-pipe line 20. This pipe line 20 is provided with suitable spray nozzles or discharge openings 21 through which streams or sprays of irrigating water may pass, and the pipe line 20 is preferably a long straight line of piping supported on posts or hangers 22 arranged along the length of the piping so that the latter may be rocked or oscillated back and forth by the fluid motor to effect the proper distribution of the irrigating streams, over a considerable expanse of ground.

The water motor 10 has the piston thereof operably connected to a reciprocating device designated generally 23 and the latter is adapted to be moved back and forth as the piston reciprocates in a manner to be later described. The reciprocating device 23 carries a pin or lug 25 which is received in a bifurcation in the upper end of a ratchet lever 24, this lever being pivoted at its lower end on a bolt 103 which is fixed to a stationary base member 104 of the structure. The lever 24 is provided with a ratchet dog 26 pivotally mounted thereon between the pivot support and the operating pin 25, this dog being adapted to engage in a series of notches 27 of a ratchet segment 28. The force exerted on the ratchet segment is of course proportionately greater than that exerted by the pin 25 due to the relative differences in the lever arms or distances from the pivot at the lower end of the lever 24, and as the notched periphery of the segment is at a distance from the pipe 20 substantially exceeding the effective lever arm of the ratchet lever 26 the force effective in turning the pipe line is proportionately multiplied. The segment 28 is supported as by means of the arms 29 upon the hub-plate 30 which is adapted to be clamped rigidly on the distributing pipe 20 by means of the clamp bolts 31 and the clamp cap 32. The distributing pipe is thus caused to move slowly about its own axis, being guided at various points by the hangers or posts 21, as the ratchet dog 26 oscillates back and forth and moves the ratchet segment along step by step.

The ratchet segment 28 is provided with a series of transverse holes 35 and two reversing pins 36 and 37 are received in two of these holes, these pins being removable so that they may be inserted in the proper hole as desired. The pins project considerably beyond the side faces of the ratchet segment, extending from the side of the segment toward the motor 10 far enough to engage the inclined side of the reversing dog at a distance above the pivot axis of the latter, so that it causes the reversal of the ratchet dog 26 by engaging therewith when the distributing pipe has been turned in one direction as far as it is intended to go, the end of the reversing pin at this time causing the dog 26 to flip over so that succeeding oscillatory movements of the lever 24 will be effective through the dog 26 in moving the ratchet segment in the opposite direction. The other reversing pin will then be engaged by the dog 26, at which time the dog will again be reversed. The distributing pipe 20 will therefore be oscillated back and forth periodically during the operation of the fluid motor, and the amount of angular movement which is given to the distributing pipe may be adjusted to any value desired by placing the reversing pins in the proper holes in the ratchet segment. The position of the movement as well as the amount of movement imparted to the distributing pipe can be regulated through the positioning of the reversing pins, and it will be understood that the distributing nozzles on the distributing pipe can thus be caused to water the ground at one side of the pipe only if desired, and can be moved through as great or as small a degree of motion as desired.

In order to prevent backlash of the distributing line from interfering with the reversal of the direction of movement of the ratchet segment and of the line, a backlash attachment is provided. For this purpose a plate 40 is attached in position to the lower portion of the motor, the plate being located closely adjacent the rear face of the ratchet segment. The ratchet segment forms a support for a casting 41 within which is a spring 43 pressing at one end against an adjustment nut 42 and at its other end against a plunger 44 which has a sharp nose projecting rearwardly through the ratchet segment and engaging the roughened or serrated surface of the plate 40. This arrangement provides for a yielding locking connection between the fluid motor and the distributing pipe so that any backlash which may be present in the pipe line is not effective in interfering with the proper step-by-step movements and the reversal of direction of travel of the ratchet segment. The force of engagement of the spring-pressed nose with the serrated plate 40 may be adjusted by turning the hexagonal-shaped end of the adjustment screw 42, so that the yielding connection is of the proper value, somewhat greater than the twisting tendency due to backlash of the pipe line but not great enough to interfere with the normal operation of the fluid motor.

To start the system in operation when it is desired to provide for distribution of water from the distributing pipe 20, the feeder valve handle 45 is turned to permit the water to flow from the riser pipe 17 through the globe valve 14 to the interior of the water motor and also along the distributing line 20. The water motor being thus supplied with power causes the periodic reciprocation of the reciprocating member 23, the exhaust or discharge water from the motor flowing out through a discharge orifice 46. This discharge orifice 46 is provided on the side of the water motor and is mounted in place on an oscillating arm 47 which is bifurcated at 48 so as to engage or straddle an operating pin 49 provided on the rear side of the reciprocating member 23. The side of the arm 47 which is adjacent to the fluid motor is provided with a pipe or passage 46' communicating with the discharge opening of the fluid motor so that the water which is effective in causing the operation of the motor may be discharged through the passage in the arm 47 and out through the discharge nozzle 46. The pipe 46' serves as a pivotal support for arm 47, rotatably mounting it on the cylinder. Due to the connection at the lower end of the oscillating arm 47 with the reciprocating member of the device, it will be seen that the exhaust nozzle is oscillated back and forth in accordance with the reciprocating movements of the member 23, and the discharge or exhaust water flowing from the fluid motor is distributed and discharged in a stream which is directed first to one side of the motor and then to the other so that puddling from waste water is avoided.

In order to control the speed of operation of the motor the exhaust arm 47 is provided with a valve effective in controlling the rate of flow through the exhaust nozzle. The rate of flow is adjusted to vary the speed of the motor by means of a manually operable needle valve regulator 50 which may be screwed into a threaded opening in the member 47 varying amounts to cause a greater or lesser restriction in the exhaust passage from the motor. The fluid motor, which has a large turning power developed from the leverage ratio employed, itself operates thoughout the operating range upon such a small portion of the water available that there is no objectionable reduction of pressure on the spraying line. By proper manipulation of the valve 50 the speed of reciprocation of the motor piston may be varied and so the rate of travel of the dog 26.

By closing off the valve 50 the fluid motor can be entirely stopped so that the spraying streams from the distributing pipe may continue with full force with the distributing pipe stationary.

The detailed construction of the fluid motor which is preferably used is shown in Fig. 4. As shown in that figure, the fluid motor comprises a body chamber 52 formed of two cylinders 53 and 54 which are threaded at both ends, the inner ends being received in a central ring member 55, and the outer ends being threaded in the end-plates 56 and 57 respectively. The central member 55 is formed as a casting provided with an inlet chamber 60 and a separate outlet chamber 61, the inlet chamber being in unrestricted communication by means of an opening in the lower portion thereof with the interior of the nipple 12 by which it is fastened in place. The exhaust chamber 61 communicates with the passage provided in the swinging exhaust arm 47. Valve seats 62, 63, 64 and 65 are mounted in the opposing walls of the casting 55 to receive an inlet-valve member 66 and an exhaust-valve member 67. The inlet-valve member 66 extends through and is centered and guided within the openings provided in the valve seats 64 and 65 and between these valve seats is a valve enlargement 68 on the valve member which is adapted to close the inlet opening into the cylinder 53 or the cylinder 54 alternately, it being understood that the shape of the valve member 66 is such as to permit a flow of liquid from the chamber 60 through the valve which is open at the time, although some portions of the valve member are slidingly guided on the valve seats to maintain the parts in alignment. The exhaust-valve member 67 is provided with a body part 70 which is guided and centered in the valve seats 62 and 63 and has valve enlargements at each end, the body part having irregular noncylindrical surfaces so that when one of the valves is open the water may be discharged from the adjacent cylinder into the exhaust chamber 61.

Within each of the cylinders 53 and 54 is a piston and a valve-operating part. For example, the cylinder 53 is provided with a piston, adapted to be moved back and forth along the cylinder, which, as shown, embodies a flexible member or cup leather 73 clamped between the two plates 74 and 75 which are both threaded on a piston-rod 76. This piston-rod extends through the end-plate 56 and is fastened rigidly to a cross-bar 77 by means of a set-screw 78. This cross-bar 77 is rigidly attached to two longitudinally extending straps 79 and 80 which are located on opposite sides of the cylinder body, and which are connected at their other ends at points spaced from the end-plate 57 to a similar cross member 81, similarly connected to the piston-rod 82 of the piston 83 which is positioned within the opposite cylinder 54,—it being understood that similar construction obtains at opposite ends of the motor, these several members when connected together constituting the reciprocating device or frame 23. It will be apparent that as water flows, for example, into the cylinder 54 to move the piston 83 downwardly in Fig. 4, the reciprocating device comprising the straps 79 and 80, the cross members 77 and 81 and the piston connections, will be moved endwise with relation to the cylindrical body of the motor, the exhaust water from the cylinder 53 passing out through the open exhaust valve into the exhaust chamber 61 and from there it will be exhausted through the exhaust or discharge nozzle previously described.

The operation of the valves of the motor is such as to cause them to be quickly moved from one operative position to the other to insure the proper periodic reciprocation of the piston and to secure a full immediate or instantaneous action. For this purpose the piston 73 is provided with a valve-operating plate 85 which is mounted on the end of a valve rod 86, this valve rod extending through an opening in the piston-rod and projecting from the rear end of the piston-rod where it is attached rigidly to a valve block 87 by means of a fastening screw 88. This valve block 87 normally abuts against the outer side of the cross-bar 77, and is held in this position by a helical spring 89 provided within the piston-rod which engages a packing gland 90, cooperating with suitable packing 101, on the inside of the piston-rod, and which presses at its other end against a shoulder 91 on the valve rod. The outer end of the piston rod encloses a bushing 102 which guides the valve rod and retains the packing 101, the bushing being brazed or pinned or otherwise fixed to the piston rod. The normal relation and spacing between the valve plate 85 and the piston is as shown in Fig. 4 except when the piston is closely adjacent the valves. After the piston has been moved inwardly within the cylinder to a point where it is close to the end of its stroke the tripping flange 93 mounted in any suitable manner in the end plate 56, is engaged by a finger 94 which is pivoted at 95 on the lower end of the valve block 87. This finger is normally spring pressed towards the piston-rod by means of a spring 96 which is suitably fixed to a stud 97 on the lower end of the cross member 77. This cross member 77 has a cam surface 98 adapted to engage with a corresponding cam surface 99 on the finger 94 to cam the finger outwardly as the piston continues to move toward the end of its stroke towards the valves. Assuming the parts are in the position shown in Fig. 4, further downward movement of the piston 73 towards the valves can take place, but the finger 94 at this time has just engaged against the flange 93 to prevent further movement of the valve rod and valve plate towards the valves while the piston continues in its downward movement. The valve block 87 thus remains stationary and the spring 89 is compressed and placed under tension. When the cam surface 98 has traversed to the cam surface 99 on the finger it presses the finger outwardly about its pivot 95 against the tension of the spring 96. This motion of the finger, in withdrawing its end from engagement with the flange 93, releases the valve rod to permit its operation and it is snapped toward the valves as the spring 89 extends. At this time the piston will be at the very end of its stroke, with the exhaust valve still wide open and with the intake valve tightly closed. When the finger is released the spring 89 causes the instantaneous movement of the valve rod and the valve plate to bring the plate into driving contact with the valves to reverse their positioning, these parts moving through a considerable distance to effect the operation of the intake and exhaust valves to cause the complete opening of the inlet valve and the complete closing of the exhaust valve. The flow of water is thus directed into the cylinder portion 53 and acts to push the piston outwardly, the other piston 83 in the meantime being moved inwardly on the exhaust stroke, and in turn this piston will operate the intake and exhaust valves of the cylinder by means of the spring-pressed valve plate 100 which is similar in construction and operation to the corresponding part of the opposite cylinder. As the cylinder body portion of the motor is fixed in a horizontal position, in operation, the valve members 66 and 67 would have no tendency to move from the positions to which they have been adjusted by the spring-pressed valve plates until they are again moved by the other valve plate, and the water pressure effectively holds the valves in their adjusted positions. The flow of water is supplied first to one cylinder and then to the other, the water being exhausted from one cylinder as it is supplied to the other so that the fluid motor causes a periodic reciprocation of the straps 79 and 80 and the other portions of the reciprocating device, which is connected as previously set forth to cause the swinging or rotational oscillation of the distributing pipe 20. By reason of the construction of the valve-operating mechanism the valves are not moved until the piston reaches substantially the end of its stroke and at that time the valves are instantaneously moved to cause the complete opening or closing of the passages communicating with the inlet or outlet chambers of the motor, and freedom from the objectionable "sticking" or failure to operate results.

It will now be clear that an irrigation system has been provided in which a distributing pipe is oscillated back and forth by a motor which does not swing with the pipe. Consequently the weight of the motor itself does not form any part of the load driven by the motor. Where a motor is fixed to the distributing pipe and oscillates with it part of the effort produced by the motor is needed to overcome the unbalanced weight of the motor, and this objection is thus obviated in the present device. The motor employed is one which is capable of developing a large amount of power while utilizing only a comparatively small part of the water flowing through the system. The amount of water exhausted from the motor is therefore comparatively small and due to the manner in which the discharge from the motor is swung constantly from one side of the pipe to the other any puddling on the ground is prevented, and the exhaust water from the motor is efficiently distributed and utilized for irrigational purposes. The amount of water utilized by the motor being small and constituting only a small part of the water supplied to the system permits the distribution of water from the spraying pipe without objectional reduction in pressure.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an irrigation system of the class described, a distributing pipe, a water motor mounted in fixed position adjacent thereto, a leverage-multiplying connection between said motor and said pipe whereby the pipe is oscillated by the water motor, water discharge means for said water motor independent of said distributing pipe, and means for automatically varying the direction of flow of the discharge from said water discharge means during the operation of the same.

2. In an irrigation system of the class described, a distributing pipe, a water motor mounted in fixed position adjacent thereto, a leverage-multiplying connection between said motor and said pipe whereby the pipe is oscillated by the water motor, an exhaust nozzle for said motor, and means for oscillating said nozzle during the operation of the water motor.

3. In an irrigation system, or the like comprising a member to be oscillated, an automatic oscillator comprising a fluid motor, means for mounting said motor in fixed position, means reciprocally operated by said motor, an operating connection between said last means and a load whereby the latter is caused to oscillate during the operation of the fluid motor, a discharge nozzle for the exhaust motor, and an operating connection between said discharge nozzle and said reciprocating means to cause movement of the nozzle for the distribution of the discharge fluid from the motor.

4. In a device of the class described, a distributing pipe, a fluid motor mounted in fixed position adjacent thereto, and a ratchet connection between said motor and said pipe for causing the oscillation of the pipe, and a backlash attachment associated with said ratchet connection to prevent backlash twist of the pipe from interfering with the operation of the ratchet connection.

5. In a device of the class described, an oscillator having provision for its attachment to a distributing pipe for causing the oscillation of the pipe comprising a water motor, means supporting said motor in fixed position, a reciprocating member operated by said motor, a ratchet segment cooperating with said reciprocating member moved step by step by said reciprocating member, and a yielding locking device for yieldingly connecting said segment to said water motor to prevent backlash twist of the distributing pipe from interfering with reversal of the direction of movement of said pipe.

6. In an irrigation system, a water motor having a stationary cylinder, a piston reciprocally operable therein, a reversible ratchet lever operated by said piston, a member having a single series of teeth operated slowly step by step by said lever, a distributing pipe connected to said member, and means for automatically reversing the ratchet after a predetermined movement of the said member.

7. In an irrigation system, a water motor having a stationary cylinder, a piston reciprocally operable therein, a reversible ratchet lever operated by said piston, a member operated by said lever, a distributing pipe connected to said member, and means for automatically reversing the ratchet after a predetermined movement of the said member, said means comprising adjustable pins with which the lever engages at predetermined positions of the said member.

8. In an irrigation system of the class described, a distributing pipe, a water motor mounted in fixed position adjacent thereto, a connection between said motor and said pipe whereby the pipe is oscillated by the water motor, an exhaust nozzle for said water motor, and means for oscillating said nozzle during the operation of the water motor.

9. In a device of the class described, a distributing pipe adapted to be oscillated about its longitudinal axis, a water motor for oscillating said distributing pipe, a single ratchet connection operated by said water motor for causing step by step movements of said distributing pipe, and a backlash attachment to prevent backlash twist of the pipe from interfering with the operation of the ratchet connection and comprising a spring pressed member for yieldingly holding said distributing pipe.

10. In a device of the class described, an oscillator adapted to be attached to a distributing pipe for causing the oscillation of the pipe, comprising a water motor, means supporting said motor in fixed position, a reciprocating member operated by said motor, a single ratchet pawl connected to said reciprocating member, a single ratchet segment adapted to be moved step by step by said ratchet pawl, and a backlash attachment associated with said segment to connect said segment to said water motor to prevent backlash twist of the distributing pipe from interfering with the operation of the pawl.

In testimony whereof we hereto affix our signatures.

WALTER H. COLES.
BERT J. NELSON.